US008914618B2

(12) United States Patent
Wang et al.

(10) Patent No.: US 8,914,618 B2
(45) Date of Patent: Dec. 16, 2014

(54) INSTRUCTION SET ARCHITECTURE-BASED INTER-SEQUENCER COMMUNICATIONS WITH A HETEROGENEOUS RESOURCE

(75) Inventors: Hong Wang, Santa Clara, CA (US); John Shen, San Jose, CA (US); Hong Jiang, San Jose, CA (US); Richard Hankins, San Jose, CA (US); Per Hammarlund, Hillsboro, OR (US); Dion Rodgers, Hillsboro, OR (US); Gautham Chinya, Hillsboro, OR (US); Baiju Patel, Portland, OR (US); Shiv Kaushik, Portland, OR (US); Bryant Bigbee, Scottsdale, AZ (US); Gad Sheaffer, Haifa (IL); Yoav Talgam, Tel-Aviv (IL); Yuval Yosef, Hadera (IL); James P. Held, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1328 days.

(21) Appl. No.: 11/321,779

(22) Filed: Dec. 29, 2005

(65) Prior Publication Data

US 2007/0157211 A1 Jul. 5, 2007

(51) Int. Cl.
*G06F 9/30* (2006.01)
*G06F 15/76* (2006.01)
*G06F 9/38* (2006.01)

(52) U.S. Cl.
CPC ............... *G06F 9/30* (2013.01); *G06F 9/3877* (2013.01); *G06F 9/3879* (2013.01); *G06F 9/30181* (2013.01)
USPC ........................................... 712/220; 712/34

(58) Field of Classification Search
USPC .......................................................... 712/220
See application file for complete search history.

(56) References Cited

U.S. PATENT DOCUMENTS

| 5,202,988 | A | * | 4/1993 | Spix et al. ..................... 709/234 |
| 5,890,003 | A | * | 3/1999 | Cutts et al. ..................... 710/263 |
| 5,996,083 | A | * | 11/1999 | Gupta et al. ................... 713/322 |
| 6,766,515 | B1 | * | 7/2004 | Bitar et al. ..................... 718/100 |

(Continued)

FOREIGN PATENT DOCUMENTS

| EP | 1 233 340 A2 | 8/2002 |
| JP | 2002-073331 | 12/2002 |

OTHER PUBLICATIONS

Suessmith, Brad, Paap, George. "The Making of the Power PC" Communications of the ACM. Jun. 1994, vol. 37, No. 6, pp. 43-46.*

(Continued)

*Primary Examiner* — Jacob A Petranek
(74) *Attorney, Agent, or Firm* — Trop, Pruner & Hu, P.C.

(57) ABSTRACT

In one embodiment, the present invention includes a method for directly communicating between an accelerator and an instruction sequencer coupled thereto, where the accelerator is a heterogeneous resource with respect to the instruction sequencer. An interface may be used to provide the communication between these resources. Via such a communication mechanism a user-level application may directly communicate with the accelerator without operating system support. Further, the instruction sequencer and the accelerator may perform operations in parallel. Other embodiments are described and claimed.

10 Claims, 7 Drawing Sheets

(56) References Cited

U.S. PATENT DOCUMENTS

| | | | |
|---|---|---|---|
| 6,799,265 B1* | 9/2004 | Dakhil | 712/217 |
| 6,832,305 B2* | 12/2004 | Park et al. | 712/34 |
| 6,842,180 B1* | 1/2005 | Maiyuran et al. | 345/541 |
| 6,944,746 B2* | 9/2005 | So | 712/34 |
| 7,225,446 B2* | 5/2007 | Whitton | 718/108 |
| 7,395,450 B2* | 7/2008 | Karaki | 713/600 |
| 2002/0010848 A1 | 1/2002 | Kamano et al. | |
| 2002/0013892 A1 | 1/2002 | Gorishek, IV et al. | |
| 2006/0150183 A1 | 7/2006 | Chinya et al. | 718/100 |
| 2006/0150184 A1 | 7/2006 | Hankins et al. | 718/100 |

OTHER PUBLICATIONS

"Microsoft Computer Dictionary" 5th edition, 2002, p. 378.*

U.S. Appl. No. 11/100,032, filed Apr. 5, 2005, entitled "Sequencer Address Management" by Hong Wang et al.

U.S. Appl. No. 11/173,326, filed Jun. 30, 2005, entitled "A Mechanism for Instruction Set Based Thread Execution on a Plurality of Instruction Sequencers" by Hong Wang et al.

Chinese Intellectual Property Office First Office Action dated Apr. 4, 2008, with English Language Translation, pp. 1-15.

Brad Suessmith, et al., "PowerPC 603 Microprocessor Power Management" Jun. 31, 1994, pp. 43-46.

Korean Intellectual Property Office Notice of Preliminary Rejection dated Feb. 28, 2008, with English Language Translation, pp. 1-9.

State Intellectual Property Office, P.R. China, Third Office Action dated Apr. 17, 2009, in a related application.

Chinese Patent Office, Fourth Office Action dated Oct. 23, 2009 in related foreign patent application No. 200610064226.3.

Japanese Patent Office, first Official Action dated Jan. 26, 2010 in Japanese patent application No. 2006-348294.

* cited by examiner

INSTRUCTION SET ARCHITECTURE-BASED INTER-SEQUENCER COMMUNICATIONS WITH A HETEROGENEOUS RESOURCE

BACKGROUND

Embodiments of the present invention relate to improving communications in a processor-based system, and more particularly to a system including multiple sequencers.

Computer systems include various components to process and communicate data. Typical systems include one or multiple processors, each of which may include multiple cores, along with associated memories, input/output (I/O) devices and other such components. To improve computation efficiencies, computation accelerators, special-purpose I/O devices and other such specialized units may be provided via one or more specialized components, referred to generically herein as helper units. However, inefficiencies may occur in using such helper units, as in a typical computing environment that implements a general-purpose processor and an industry-standard operating system (OS) environment, a software stack can impede efficient usage. That is, in a typical OS environment, system software is isolated from application software via different privilege levels, and operations in each of these different privilege levels are subject to OS context save and restore operations, among other limitations.

Thus whenever a helper unit such as a special-purpose accelerator is incorporated, it is usually exposed as a device and a user-level application can only indirectly use the helper unit via the OS's device driver software stack, which has direct access to the raw physical helper unit resource. Consequently, the helper unit resource via the associated device driver is a system-wide resource and not an application-level resource such as general-purpose registers, virtual memory or sequencers, which are virtualized across context switches.

The problem with having to use a device driver to access a helper unit is the inefficiency (in terms of path length from application to driver to the helper unit), and inflexibility due to OS-imposed restrictions related to "standardized" driver interfaces.

Classic examples of a computation accelerator are coprocessors such as math coprocessors (like so-called ×87 floating point coprocessors for early Intel® Architecture (IA)-32 processors). Typically, such coprocessors are coupled to a main processor (e.g., a central processing unit (CPU)) via a coprocessor interface, which is of a common instruction set architecture (ISA) as the main processor. Furthermore, the interaction between these resources is via a traditional escape/wait signal protocol, in which the main processor is placed in a wait state while the coprocessor performs its requested function, at the conclusion of which control returns back to the main processor. However, during coprocessor operations, the main processor cannot perform useful work while waiting for a result from the coprocessor. That is, the coprocessor is integrated such that it architecturally operates sequentially with the program order of the control flow of a main processor. This leads to inefficiencies in processor utilization, especially, when the coprocessors are capable of operations that are concurrent with computation on the main processor. A need thus exists for an improved manner of communicating with and using such helper units.

DETAILED DESCRIPTION

In various embodiments, mechanisms are provided to enable instruction set architecture (ISA)-based inter-sequencer communications. As used herein, a "sequencer" is a distinct thread execution resource and may be any physical or logical unit capable of executing a thread. A sequencer may be a logical thread unit or a physical thread unit, and may include next instruction pointer logic to determine the next instruction to be executed for the given thread.

More particularly, ISA-based inter-sequencer communications may be implemented between a first sequencer of a first ISA and a second resource, which may be a sequencer or non-sequencer, of a heterogeneous nature. That is, the second resource may be a sequencer of a different ISA or may be a non-sequencer resource, such as a fixed function unit (FFU), an application specific integrated circuit (ASIC) or other preprogrammed logic. In various embodiments, an intermediary or interface, referred to herein as an "exo-skeleton," may provide for communication between such heterogeneous resources. In different embodiments an exo-skeleton may take various forms, including software, hardware, and/or firmware. In some embodiments, the exo-skeleton may be implemented in a finite state machine (FSM) tightly coupled to the heterogeneous resource. Of course, other implementations are possible.

Figure 1:
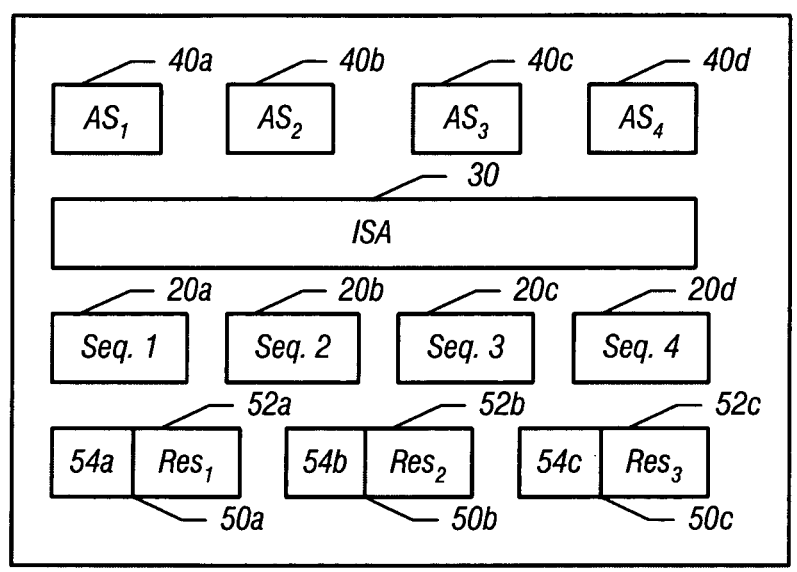
FIG. 1 is a block diagram of a processor in accordance with one embodiment of the present invention.

Referring now to FIG. 1, shown is a block diagram of a processor in accordance with one embodiment of the present invention. As shown in FIG. 1, processor 10 includes a variety of different resources. In different implementations, processor 10 may be a single core processor or a multi-core processor. Such a processor may be implemented in different types of systems, including a chip multiprocessor (CMP) system or a simultaneous multithreading (SMT) system or a switch-on-event multithreading (SoeMT) system, among other such systems.

As shown in FIG. 1, processor 10 includes a plurality of sequencers 20a, 20b, 20c, and 20d (i.e., sequencers 1-4, and generically sequencers 20). While shown with four such sequencers in the embodiment of FIG. 1, it is to be understood that the scope of the present invention is not so limited. As shown in FIG. 1, sequencers 20 in processor 10 implement an ISA 30, which in one embodiment may be an Intel® Architecture (IA-32) instruction set architecture and/or its 64-bit extension (also called Intel® extended memory 64-bit technology (EM64T)). Processor 10 further includes other resources, including a first resource (i.e., resource 1) 50a, a second resource (i.e., resource 2) 50b, and a third resource 50c (i.e., resource 3) (and generically resources 50). These resources may be heterogeneous resources that do not implement the ISA 30 of processor 10. While shown in the embodiment of FIG. 1 as including three such resources, more or fewer are possible in different embodiments.

Each resource 50 includes a sequencer (which may implement a different ISA from ISA 30), non-sequencer processing engine, or other specialized functional logic, referred to generically herein as an accelerator. In different embodiments, different types of resources may be implemented as accelerators, including a graphics processing unit (GPU) (typically a sequencer), a cryptographic unit (typically a non-sequencer), a physics processing unit (PPU) (typically a non-sequencer), a fixed function unit (FFU) (typically a non-sequencer) and the like. As shown in FIG. 1, each resource 50 may include an accelerator 52 (generically) and more specifically, accelerators 52a, 52b, and 52c, each associated with one of resources 50a-50c. Accelerators 52 are also referred to herein as helper units. Because resources 50a-50c may be of another ISA or may even be a non-sequencer and as such can be heterogeneous with respect to sequencers 20, an interface may be used to provide the ability to communicate with such resources. Specifically as shown in FIG. 1, exo-skeletons 54a, 54b, and 54c (generically exo-skeleton 54) may be associated with each of resources 50. Each resource 50 may thus be referred to as an "exo-sequencer," indicating the tight coupling between exo-skeleton 54 and its associated accelerator 52. In this manner, these heterogeneous resources may be integrated with homogeneous sequencer resources in a unified ISA framework that supports inter-sequencer communication (and/or shared memory-based addressing if applicable). Furthermore, the various resources may execute in a parallel fashion, for example, in a multiple instruction multiple data (MIMD) fashion so that each resource may be used concurrently to improve performance.

However in other embodiments, resources 50 may be homogeneous sequencer resources with respect to sequencers 20 and can be symmetric cores such that they include the same or similar architecture as sequencers 20. In such manner, concurrent fibers may be implemented and legacy OS scalability can be enhanced. Still further, in other implementations resources 50 may be asymmetric cores. In other words, these resources may be of the same ISA as sequencers 20, but of a different microarchitecture. Such embodiments may help manage the asymmetry and provide compatibility with a legacy OS.

For embodiments that implement heterogeneous resources, an exo-skeleton in accordance with an embodiment may provide the illusion that these heterogeneous resources are of a common ISA to achieve minimal compliance for inter-sequencer communications. Thus in various embodiments, a heterogeneous resource can function as a user-level functional unit resource (rather than a system-level device). In other words, various user-level applications may directly communicate with and access the accelerator such that it becomes a user-level functional unit. In this way, various accelerator resources can become ISA-managed heterogeneous components.

For example, each exo-sequencer or resource 50 may expose a special-purpose computation accelerator with a sequencer-like "wrapper" exo-skeleton 54 so that these accelerators 52 can be used directly by application programs as user-level heterogeneous computation resources, such as MIMD resources.

Accordingly, an application programmer can directly use a user-level ISA 30 to program these helper units 52, even though the helper unit itself physically is not necessarily of the ISA 30. Further, the programmer can use a uniform ISA mechanism to program a diverse set of heterogeneous helper units, each having distinct "characteristics" (in terms of ISA or device attributes). In effect, an exo-sequencer in accordance with an embodiment of the present invention allows the programmer to short circuit a legacy device driver software stack. To this end, an exo-sequencer may thus equip a helper unit with a veneer exo-skeleton and make the helper unit appear to be a minimal sequencer that can participate in sequencer-aware ISA-based inter-sequencer operations of a processor or other device. From the perspective of a software stack, with an exo-sequencer an application program or user-runtime can provide an application-level software layer to manage the accelerator as an application resource, and as a tightly-coupled part of the application binary without the need for using a loosely-coupled OS-based device driver to manage the accelerator as a system-level resource.

Furthermore, in some implementations one or more exo-sequencers may include an explicit MIMD multi-sequencer ISA interface where each participant helper unit is architecturally used as a minimal sequencer resource, interacting with the main processor (i.e., a first sequencer) via sequencer-aware synchronous operations or asynchronous inter-sequencer interactions via fly-weight user-level event yield mechanisms. Even though the helper units and the first sequencer are tightly coupled to the same OS thread, architecturally, the main processor and exo-skeleton-equipped helper unit interact as two distinct MIME sequencers. In particular, the data and control exchange between the first sequencer and the helper unit via the exo-skeleton interface is architecturally equivalent to an inter-sequencer exchange.

While shown with the particular resources in the embodiment of FIG. 1, it is to be understood that processor 10 may be a single physical processor that can support multiple hardware thread contexts (without loss of clarity, also called "thread context", note this is not the same as software thread context), each including a set of the architectural state. In some embodiments, certain resources may be visible to these thread contexts, while other resources are invisible. Thus as shown in FIG. 1, each of sequencers 20 may correspond to a thread context. When at least some of these thread contexts (e.g., m out of n, m≤n) are made visible to the operating system, these thread contexts are sometimes referred to as logical processors or OS-managed sequencers. Each thread context maintains a set of the architecture state $AS_1$-$AS_n$, respectively. The architecture state includes, for example, data registers, segment registers, control registers, debug registers, and most of the model specific registers. The thread contexts may share most microarchitectural resources of the physical processor, such as caches, execution units, branch predictors, control logic and buses. Although such features may be shared, each thread context of processor 10 can independently generate a next instruction address (and perform, for instance, a fetch from an instruction cache, an execution instruction cache, or trace cache). Each of sequencers 20 corresponding to a thread context is associated with a corresponding architecture state 40 (generically). More specifically, architecture state ($AS_1$) 40a may be associated with sequencer 20a, $AS_2$ 40b may be associated with sequencer 20b, $AS_3$ 40c may be associated with sequencer 20c, and $AS_4$ 40d may be associated with sequencer 20d, for example.

Using processor 10 or a similar such processor, ISA-based inter-sequencer communications may occur without involving an OS. For example, in a shared-memory multiprocessing paradigm an application programmer may split a software program (i.e., an application or process) into multiple tasks to be run concurrently in order to express parallelism. All threads of the same software program ("process") share a common logical view of memory address space. However, an OS thread may be associated with multiple user-level threads that may not be created, scheduled, or otherwise managed by the operating system. Such user-level threads may be referred to as "shreds," in order to distinguish them from OS threads. These shreds may not be visible to the OS scheduler and therefore the OS does not manage when or how the associated OS thread schedules a shred to run on an assigned logical sequencer address. The OS thread is itself usually responsible to schedule when and how to run one of its shreds.

Architectural support for ISA-based inter-sequencer communications may include extensions to an ISA such that one or more instructions are provided to allow a user to directly manipulate control and state transfers between sequencers, which may be so-called sequencer-aware or sequencer-arithmetic instructions. Such instructions may include instructions that either provide for a first sequencer to signal another (i.e., a second) sequencer (one instruction is referred to herein as a shred transfer or "SXFR" instruction, which may send egress control information, called an egress scenario, and may also carry data payload) or provide for setting up a second sequencer to monitor for such a signal (referred to herein as a shred monitor or "SEMONITOR" instruction) and perform control transfer to a handler upon receiving the signal (called an ingress scenario) asynchronously.

Sequencer-aware instructions may also include other instructions such as sequencer-aware state save and restore instructions. Upon execution of such a state save instruction, a first sequencer can create a snapshot copy of the architectural state(s) of a second sequencer. The sequencer-aware restore instruction may designate that the saved architectural states be loaded to a specified sequencer.

For at least one embodiment, one or more sequencer-aware instructions may be coded by a programmer into the shreds belonging to an OS thread. Such instructions, when executed during operation of the OS thread, may cause creation, control transfer, context save, context restore or other operations for shreds, without intervention of OS scheduling logic.

In such manner, ISA-based inter-sequencer communication in accordance with an embodiment reduces overhead, improving performance. In addition to communication between sequencers of the same ISA, in various embodiments ISA-based inter-sequencer communications may occur between heterogeneous sequencers or between a sequencer and a-non-sequencer, e.g., via an exo-skeleton in accordance with an embodiment of the present invention.

Figure 2:
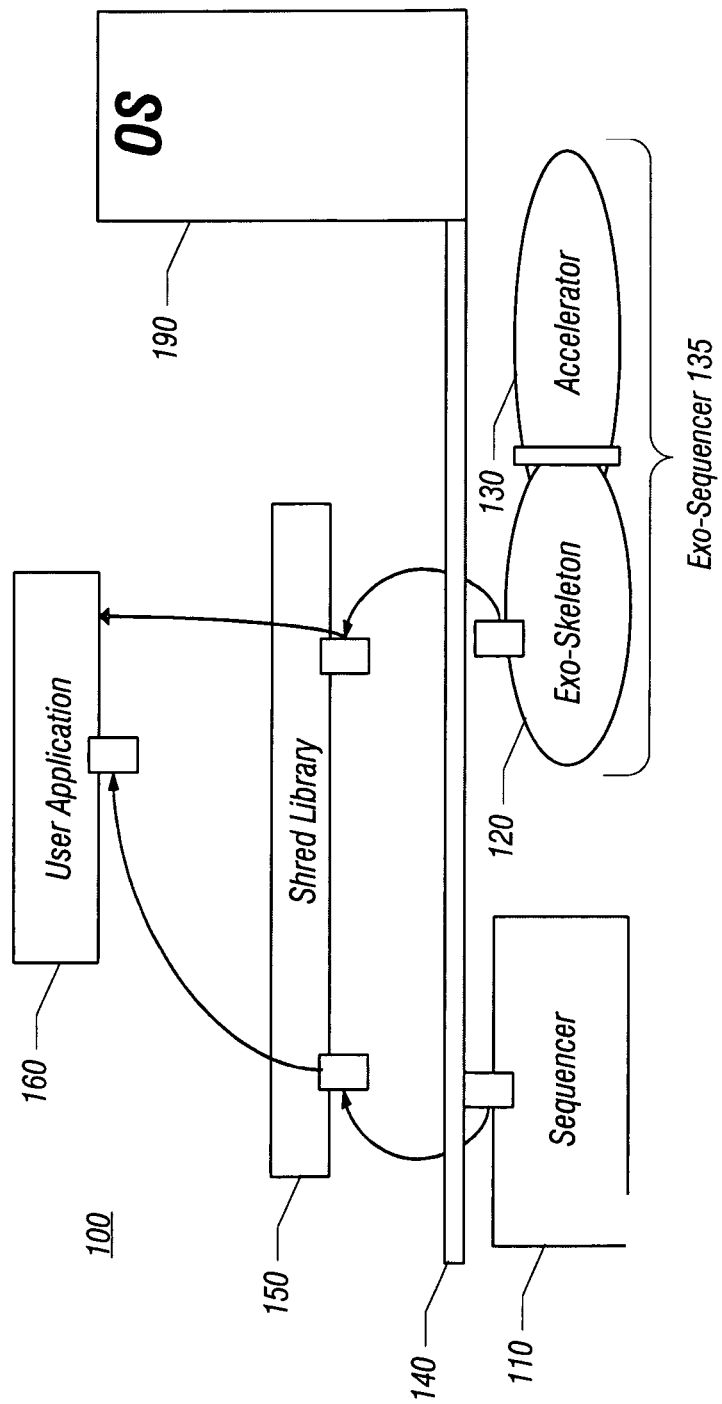
FIG. 2 is a block diagram of a portion of a system in accordance with one embodiment of the present invention.

Referring now to FIG. 2, shown is a block diagram of a portion of a system in accordance with one embodiment of the present invention. As shown in FIG. 2, system 100 includes a sequencer 110 and an accelerator 130. Accelerator 130 may take many different forms in different embodiments, but for purposes of discussion herein, it may be assumed that accelerator 130 is of a heterogeneous nature to sequencer 110. In other words, accelerator 130 may be of a different ISA or may be a non-sequencer. In various embodiments, however, sequencer 110 and accelerator 130 may be implemented on a single substrate (e.g., as part of a multi-core processor). Alternately, sequencer 110 and accelerator 130 may be implemented in different pieces of silicon within an integrated circuit (IC), or in different ICs such as located on a package or a motherboard, or in another manner.

To enable ISA-based inter-sequencer communications, an exo-skeleton 120 may be coupled to accelerator 130. Exo-skeleton 120 and accelerator 130 together are also referred to herein as exo-sequencer 135. In embodiments in which accelerator 130 is of a heterogeneous ISA or is a non-sequencer, exo-skeleton 120 which may be a finite state machine (FSM) or virtualization layer, may be implemented (in hardware, firmware or even in software, depending on specific embodiments) so that accelerator 130 can participate in inter-sequencer communications. Such ISA-based inter-sequencer communications provide a signaling protocol in an ingress direction into accelerator 130 so that it may monitor and respond to ingress scenarios sent by SXFR from another sequencer or exo-sequencer, including GET and/or SET instructions for the exo-sequencer's architectural state. Furthermore, the signaling protocols include egress communications from accelerator 130 to signal sequencer 110 with an egress scenario including an indication for exception handling such as a proxy execution request for such events as page faults. Furthermore, in some embodiments accelerator 130 via exo-skeleton 120 may participate in capability reporting-oriented communication activities such that upon a query from sequencer 110 or another resource, exo-skeleton 120 can communicate information regarding the capabilities of accelerator 130 to permit their more effective usage.

As shown in FIG. 2, exo-skeleton 120 may be tightly coupled with accelerator 130. As further shown in FIG. 2, system 100 includes a user-level runtime software layer, denoted as a shred library 150 to manage and schedule shreds, i.e., user-level threads. In different implementations, shred library 150 may implement operations to support and manage shreds on sequencers such as sequencer 110. For example, shred library 150 may manage shred scheduling, shred context save, switch, and restore, and the like. In this way, lower overhead is consumed as an OS 190 is not involved in these operations.

A user application 160 may be executing within system 100 and may request execution of a specialized or compute-intensive function. To enable improved performance, particularly in a MIMD or parallel environment, user application 160 may request that sequencer 110 communicate with accelerator 130 such that accelerator 130 is to perform a function in parallel with sequencer 110 performing other useful work of the application (or other shreds to be executed by sequencer 110). In this manner, improved execution is effected, as both sequencer 110 and accelerator 130 may execute in parallel on different portions of an application thread as shreds. Accordingly, using embodiments of the present invention, control flow of sequencer 110 can run in parallel and asynchronously with special-purpose computation performed on an exo-sequencer, which effectively operates as a separate shred.

To reduce overhead, ISA-based inter-sequencer communication between sequencer 110 and exo-sequencer 135 via sequencer-aware instructions may not require involvement of OS 190. In this way, a device driver stack of OS 190 can be avoided and instead direct communications between sequencer 110 and exo-sequencer 135 can be effected. Thus as shown in FIG. 2, in one embodiment ISA-based inter-sequencer communications may proceed directly between sequencer 110 to exo-skeleton 120 through sequencer-aware instructions. Application code 160 which may be a user application can use such ISA-based inter-sequencer communication through shred runtime library 150. A minimal OS layer 140 supports an OS thread's context save and context restore operations. When the OS thread performs context save or context restore instructions on an OS-managed sequencer, the contexts for all application managed sequencers and exo-sequencers that are associated with the OS-managed sequencer will be saved and restored accordingly. An OS may provide sufficient save area per OS thread for saving these states across OS thread context switch. There, the ISA-based inter-sequencer communication may be translated in such a manner that it can be provided to and acted upon by exo-sequencer 135. Similar communication flow may occur in the reverse direction. In at least one embodiment, the context save and restore at each sequencer or exo-sequencer upon an OS thread context switch can be performed by each sequencer or exo-sequencer in parallel with other sequencers/exo-sequencers in the same OS thread. Such parallel implementation may improve performance of the overall save and restore operations.

While shown in the embodiment of FIG. 2 as including a single sequencer 110, it is to be understood that the scope of the present invention is not so limited, and in other embodiments, a multi-sequencer system may be provided. In such a system, exo-skeleton 120 may further implement virtualization functions so that a single physical accelerator 130 may be associated by the multiple sequencers. Accordingly, exo-skeleton 120 may implement stowages for multiple contexts to store multiple copies of the architectural state of accelerator 130 for the different sequencers, each coupled to a logical exo-sequencer. Exo-skeleton 120 may further include logic to enable the saving and restoring of the context state, as well as to provide for the sequencing or multiplexing of the different sequencers to use accelerator 130. In this way, accelerator 130 may service multiple sequencers of a system. In at least one embodiment, the exo-skeleton can implement multiple logical exo-sequencers via switch-on-event multithreading. In such an embodiment, the logical exo-sequencer contexts can be implemented as distinct on-chip register files or dedicated scratch memory, and the exo-sequencer context switching condition can be implemented in logic or in firmware such as microcode. In at least another embodiment, a distinct physical exo-sequencer can be implemented for each sequencer. In this embodiment, multiple physical exo-sequencers can be implemented as simultaneous multithreading (SMT) or CMP systems.

Embodiments such as that shown in FIG. 2 may be used when an accelerator is not of the same ISA as sequencer 130 and/or the remaining system or where the accelerator is a non-sequencer. In such embodiments, the data flow shown in FIG. 2 provides for efficient ISA-based inter-sequencer communications between sequencer 110 and accelerator 130 without involvement of OS 190.

However, in other implementations an accelerator may be of a common ISA as a sequencer or other portion of the system. Still further, in some implementations an accelerator may be closely configured with a remainder of a system. For example, in some implementations an accelerator may be a system component that is configured to execute specialized operations. However, in a given system configuration the component is disabled or minimally used in favor of other components such as peripheral or add-in devices. For example, an integrated graphics processing unit (GPU) may be implemented as part of a chipset (such as a graphics memory controller hub (GMCH)) on a system motherboard. However, in certain system configurations an add-in discrete graphics card is also configured as plug-in (e.g. as on a Peripheral Component Interconnect (PCI) slot) to the motherboard. In such instances, the integrated GPU may be disabled and otherwise unused. Similarly, a GPU or other such component may include multiple different processing engines, some of which may not be fully utilized in certain system configurations.

Figure 3:
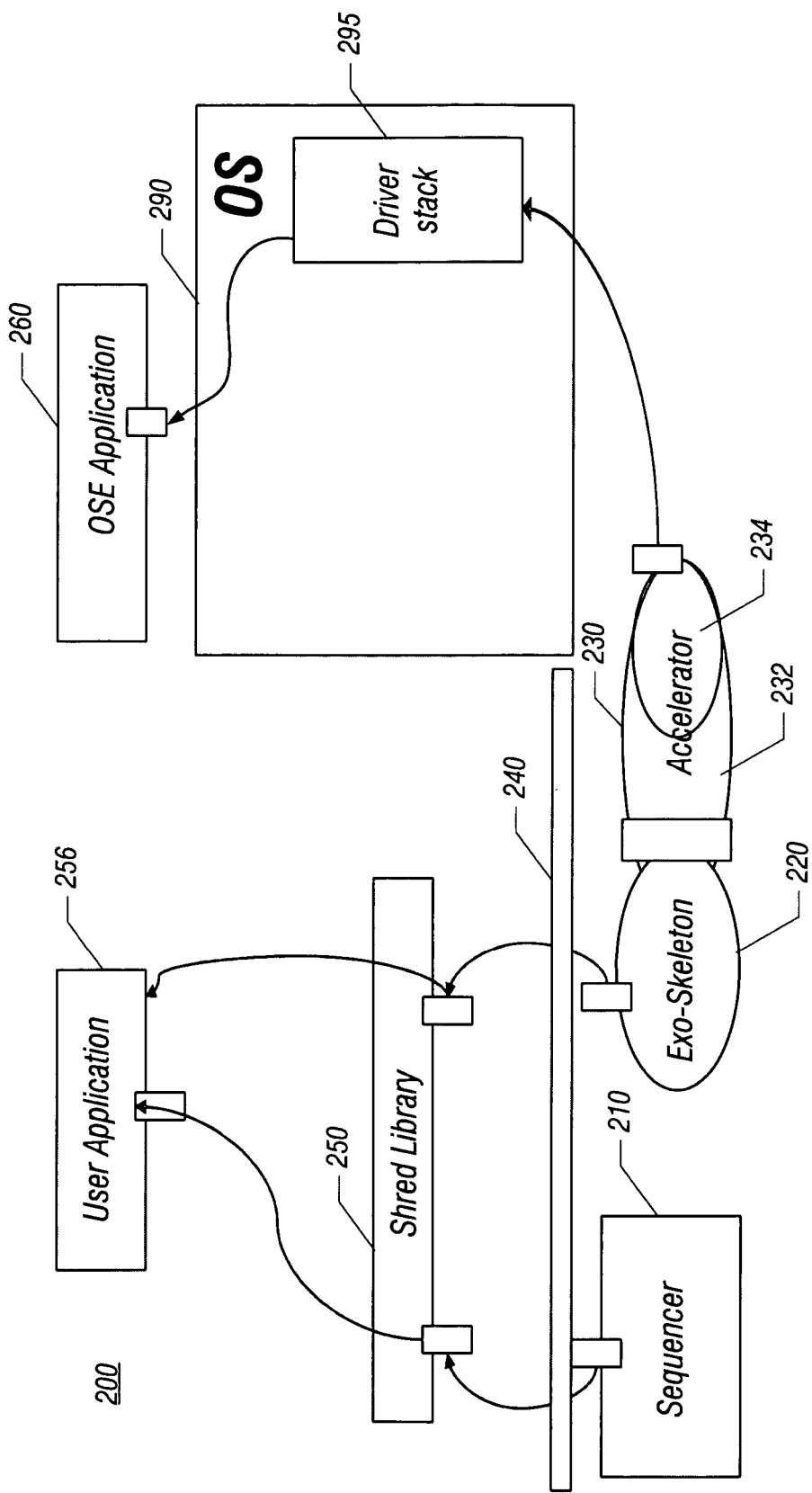
FIG. 3 is a block diagram of portion of a system in accordance with another embodiment of the present invention.

In such implementations, these otherwise disabled or minimally-used processing resources may be configured as an accelerator in accordance with an embodiment of the present invention. Referring now to FIG. 3, shown is a block diagram of portion of a system 200, which includes a sequencer 210 and an accelerator 230. In the embodiment of FIG. 3, accelerator 230 may include a first portion 232 and a second portion 234. First portion 232 may be configured to act as the exo-sequencer, while second portion 234 may be configured to perform various functions such as specialized graphics or media functions under normal OS control. Accordingly, as shown in FIG. 3, second portion 234 is coupled to a device driver stack 295 of an OS 290 such that it may communicate with an application 260 of an OS-based execution model through OS application programming interfaces (APIs) to device driver stack 295. In this manner, second portion 234 can perform processing functions under request of application 260 through a conventional OS communication route.

In contrast, first portion 232 is configured to directly communicate with sequencer 210 via an exo-skeleton 220. Exo-skeleton 220 may be hardware, software, firmware or a combination thereof to enable ISA-based communication between first portion 232 and sequencer 210. Accordingly, a user-level application 256 can use ISA-based inter-sequencer instructions for communications between sequencer 210 and first portion 232 through exo-skeleton 220. Typically, user-level shred library 250 can be used, and a minimal layer of OS support 240 is used to provide support to OS thread context save and restore operations as discussed above.

Thus, in the embodiment of FIG. 3, two software stacks may co-exist, namely the OS driver stack and a user-level runtime stack in accordance with an embodiment of the present invention. By providing for resource sharing of accelerator 230, improved performance may be effected, as both legacy-based applications (e.g., using an OS device driver model) and user-level applications that provide for minimal overhead via ISA-based inter-sequencer communications can utilize the resources of accelerator 230. In some implementations, exo-skeleton 220 may perform virtualization tasks with respect to accelerator 230 such that application 256 and application 260 both believe that they have ownership of the full resources (as visible to the application) of accelerator 230. Thus in different embodiments, exo-skeleton 220 may perform virtualization tasks including providing multiple contexts of architectural state for accelerator 230 and providing supporting to context switching under conditions akin to switch-on-event multithreading.

As such, a subset of the functionality in accelerator 230 may be associated with legacy applications via OS 290, while a different subset of the functionality may be associated with user-level applications via an ISA-based inter-sequencer communication protocol in accordance with an embodiment of the present invention. Thus, the physical resources of accelerator 230 may support co-existence of these two disparate paradigms.

Figure 4:
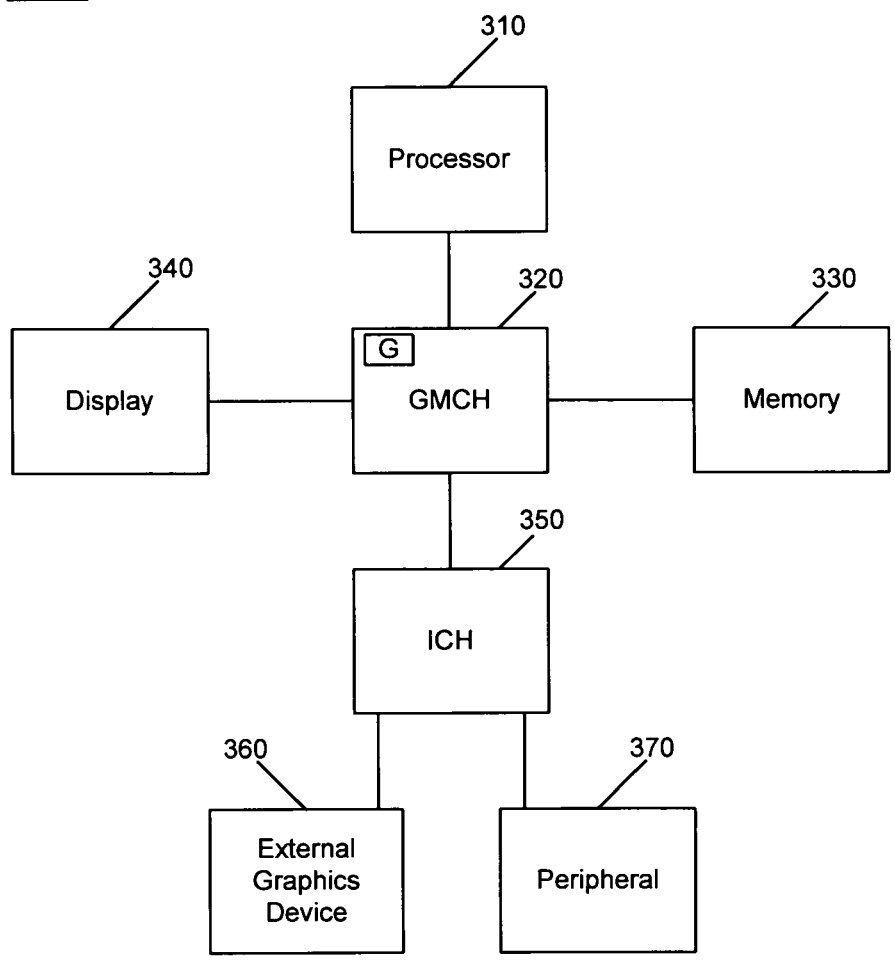
FIG. 4 is a block diagram of a system in accordance with one embodiment of the present invention.

Referring now to FIG. 4, shown is a block diagram of a system in accordance with one embodiment of the present invention. As shown in FIG. 4, system 300 includes a processor (e.g., sequencer) 310 coupled to a graphics memory controller hub (GMCH) 320 which in turn is coupled to a memory 330 that may be, for example, a dynamic random access memory (DRAM). Furthermore, GMCH 320 is coupled to a display 340 (such as a flat panel display). GMCH 320 may include an integrated graphics accelerator. GMCH 320 is further coupled to an input/output (I/O) controller hub (ICH) 350, which may be used to couple various peripheral devices to system 300. Shown for example in the embodiment of FIG. 4 is an external graphics device 360, which may be a discrete graphics device coupled to ICH 350, along with another peripheral device 370.

Because system 300 is configured with a separate external discrete graphics device 360, the integrated graphics within GMCH 320 may be disabled. For example, the system basic input/output system (BIOS) may program a disable bit, or another mechanism may disable graphics functionality (G) in GMCH 320. The otherwise idle processing resources used for graphics processing in GMCH 320 may instead be converted into an accelerator in accordance with an embodiment of the present invention. Accordingly, the resource may be used to implement various functionality, e.g., via a user-level application and without the need for OS involvement. In this way, improved performance may be effected, particularly where such processing by the graphics resources of GMCH 320 are performed in parallel (e.g., in a MIMD fashion) with tasks in sequencers in processor 310.

In some embodiments, the exo-sequencers for graphics functionality in the integrated graphics of GMCH 320 may include various graphics processing units to perform orthogonal functionalities. One or more of these processing resources may be configured as a ISA-based media accelerator exo-sequencer to implement media operations within system 300 without involvement of one or more media device drivers associated with an OS of system 300. In this way, media operations such as the encoding and decoding of digital media can be performed in system 300 with minimal involvement of processor 310 and furthermore, without suffering the overhead of a device driver stack of the OS.

In various embodiments, like a sequencer, an exo-sequencer is a form of application-level architectural resource, and thus may have a unique and virtualizable name space for use in sequencer-aware user-level operations. Thus inter-sequencer communication may be performed entirely at user-level without OS intervention. With sequencer virtualization, the logical exo-sequencer architecture resource can be managed in ways similar to register renaming and memory virtualization, where the number of physical resources do not need to be the same as the number of logical resources. Further, there can be a variety of differences between the physical resources in terms of a spectrum of metrics of merit including architectural, microarchitectural, thermal, power consumption characteristics, and the like. These differences effectively manifest themselves as asymmetry and heterogeneity amongst the exo-sequencer resources. In addition, as virtually addressable resources, exo-sequencer resources can also be subject to capability-based management where bits in a virtual sequencer address can be used by certain hardware, firmware, and software layers of abstraction to represent physical sequencer-specific capabilities to manage synchronous or asynchronous access control of the exo-sequencer resources.

In at least one embodiment, an exo-sequencer may support minimal inter-sequencer exchange protocols by providing a response to the following two canonical ingress scenarios from a first sequencer: a GET ingress scenario, in which a first sequencer can use SXFR to send the exo-sequencer the GET scenario to read/attain a state local to the exo-sequencer; and a SET ingress scenario, in which the first sequencer can use SXFR to send the exo-sequencer the SET scenario to write/update a state local to the exo-sequencer. Still further, the exo-sequencer can use a NOTIFY egress scenario and SXFR to send the first sequencer a NOTIFY scenario to perform asynchronous event notification of completion, progress or an exception condition, for example. A PROXY scenario, which may cause an accelerator to operate in a proxy execution mode on behalf of the first sequencer, is a special form of a NOTIFY egress scenario.

With this minimalist state report and update capability, the first sequencer can compose high-level control messages to manipulate data and control states (individually or in the aggregate). In particular, various composite state accesses can be built. For example using a context save/restore, either the first sequencer can repeatedly use SXFR to read or update a set of states to be saved/restored across a context switch, or in an alternative embodiment, the first sequencer can use one SXFR to read and update a subset of states that the exo-sequencer locally iterates over multiple states. Furthermore, the first sequencer can use SXFR to query configuration (i.e., capability enumeration) including states, associated attributes (write, read, etc.), format, and the like. In such manner, a special class of integrated devices which traditionally are either not sequencers or are not capable of working with a general-purpose processor without an OS-based device driver may be virtualized as desired by a particular application as if they are functional units of the processor and their states are subject to OS thread context save and restore across OS thread context switches.

In one embodiment, a helper unit of a sequencer type and of a different ISA from the first sequencer can use its private ISA to implement the exo-skeleton finite state machine (FSM) to communicate via incoming and outgoing scenarios that are architecturally defined for the first sequencer. In this manner, the helper unit can choose to use its private ISA to implement various algorithms in response to an operation requested by the first sequencer, even though the helper unit hardware itself does not directly support the operation. This sequencer FSM implementation can be done on any physical interconnect or interface. The two devices on the interconnect may signal each other, and the signal may be received and translated locally as a user-level event logically and architecturally on the first sequencer and as trigger input to the FSM. In one embodiment, the exo-sequencer's aggregate state subject to query-related context save/restore ingress/egress scenarios may be a subset (or full set) of the helper unit's original states. In this case, the exo-skeleton code in the helper unit's private ISA behaves like a microcode routine implemented in firmware to support the first sequencer's sequencer-aware operation.

In another embodiment, a sequestered sequencer of the same ISA as the first sequencer can be used as the exo-skeleton to implement a minimal FSM on behalf of the helper unit. While the private protocol between the exo-sequencer and the helper unit is not necessarily native-ISA-compliant, the first sequencer can interact with the exo-skeleton, so that the exo-skeleton presents to the first sequencer the aggregate states of itself and the helper unit (i.e., of a different ISA). The helper unit's states can be mapped 1:1 or M:1 (where M>1) by the exo-skeleton sequencer to the exo-sequencer's aggregate state. Again, the code sequence implementing the FSM to support the inter-sequencer operation of the first sequencer is like microcode-based control of the helper unit hardware.

In another example, an exo-sequencer may include a hard-wired "fixed function" helper device that has no built-in control sequencing (of any ISA), e.g., a special ASIC block with I/O logic. For such a helper unit, in at least one embodiment the exo-skeleton can be built via a proxy FSM attached to the fixed function unit. The minimal sequencer state enumeration and query interface can be implemented in the exo-skeleton FSM which has physical access to the ASIC. The exposed ASIC states can be mapped 1:1 or M:1 to the exo-skeleton sequencer states, and may be implemented in the exo-skeleton FSM. The FSM logic may be physically implemented as an interface to the ASIC block. In other embodiments the exo-skeleton FSM can be a programmable microcontroller sequencer; or a hard-wired ASIC block, but capable of intercepting ingress scenarios and emitting egress scenarios.

In one embodiment, a sequestered sequencer of the same ISA as the first sequencer can act to implement the exo-skeleton FSM, and the exo-skeleton sequencer may have physical access to the ASIC states and logically/architecturally aggregate the ASIC states plus its own states as the exo-sequencer state. In another embodiment, a sequestered sequencer of different ISA from the first sequencer can act to implement the exo-skeleton FSM.

In either case, the sequestration of the exo-skeleton sequencer can be done either physically by reserving a physical sequencer statically dedicated to a given helper unit, or dynamically multiplexed as multiple logical sequestered sequencers each logically associated with a unique helper unit. In other words, the exo-skeleton sequencer can be a virtualized sequencer via any desired scheme for sequencer address virtualization.

In one embodiment, an accelerator can have non-coherent scratch pad memory with respect to the first sequencer. To make such a helper unit an exo-sequencer, the non-coherent scratch pad states can be mapped as part of the "published" (i.e., enumerable) aggregate state of the exo-sequencer. If the scratch memory size is sufficiently large, the exo-skeleton can subject only a limited subset of the scratch state (including zero amount of state) as part of the corresponding exo-sequencer state. For example, even though an accelerator can process a frame of data of 1 kilobyte (Kb) length, the exo-sequencer may only expose the accelerator as including 256 bytes of buffer state to be save/restored.

For a helper unit device that uses a direct memory access (DMA) protocol to transfer data to/from a first sequencer, in one embodiment a private protocol between the helper unit and the exo-skeleton can remain raw DMA-based, while the exo-sequencer can present to the first sequencer the aggregate state of the exo-skeleton and the DMA configuration states on the helper unit device. Then, the DMA configuration and exo-sequencer "emulation/implementation" FSM states on the exo-skeleton can be subject to context save/restore (and thus be virtualizable across an OS context switch). However, the first sequencer does not need to be architecturally aware of any of the DMA configuration information, which is implementation specific.

In another embodiment, an exo-sequencer (e.g., as a user-level architectural resource) and a system-level (e.g., a privileged level) device resource can actually share a common physical raw building block resource. The published logical states for the exo-sequencer can be renamed to the same physical states in the building block that are accessible via read/write commands by the system-level logical device. Inside the physical helper unit, the division/partition of resources can be statically or dynamically managed, and transparent to the ISAs for both the user-level exo-sequencer and the system-level device.

Certain server platforms are equipped with encryption/decryption accelerators for speeding up network stack computations. These crypto-engines are usually physically coupled to a network processor that includes programmable micro-engines to control the crypto-accelerators. As an example, a cryptographic engine may include a random number generator or a pseudo-random number generator such as for use in hash table computations. In such an implementation, a processor micro-engine may be reprogrammed as an exo-skeleton FSM coupled with a crypto-engine, to be an exo-sequencer.

In one embodiment a sequestered accelerator can be emulated via a virtual machine extension (VMX)-based emulator virtual machine monitor (VMM). The ingress/egress scenario for state access and updates including context save/restore may be implemented on top of the sequencer emulation with additional architectural states as the exo-sequencer's aggregate state. Asynchronous NOTIFY signaling from the exo-sequencer to the first sequencer may be implemented as a PROXY scenario.

Via an exo-skeleton, additional ingress scenarios that can represent various inter-sequencer computation primitives can be emulated or passed through via the exo-sequencer FSM emulator and delivered to the sequestered raw physical resource for computation acceleration. Effectively, a subset of the raw computation resources of the helper unit may be used by application programs as if they are user-level MIMD sequencer architecture resources.

Figure 5:
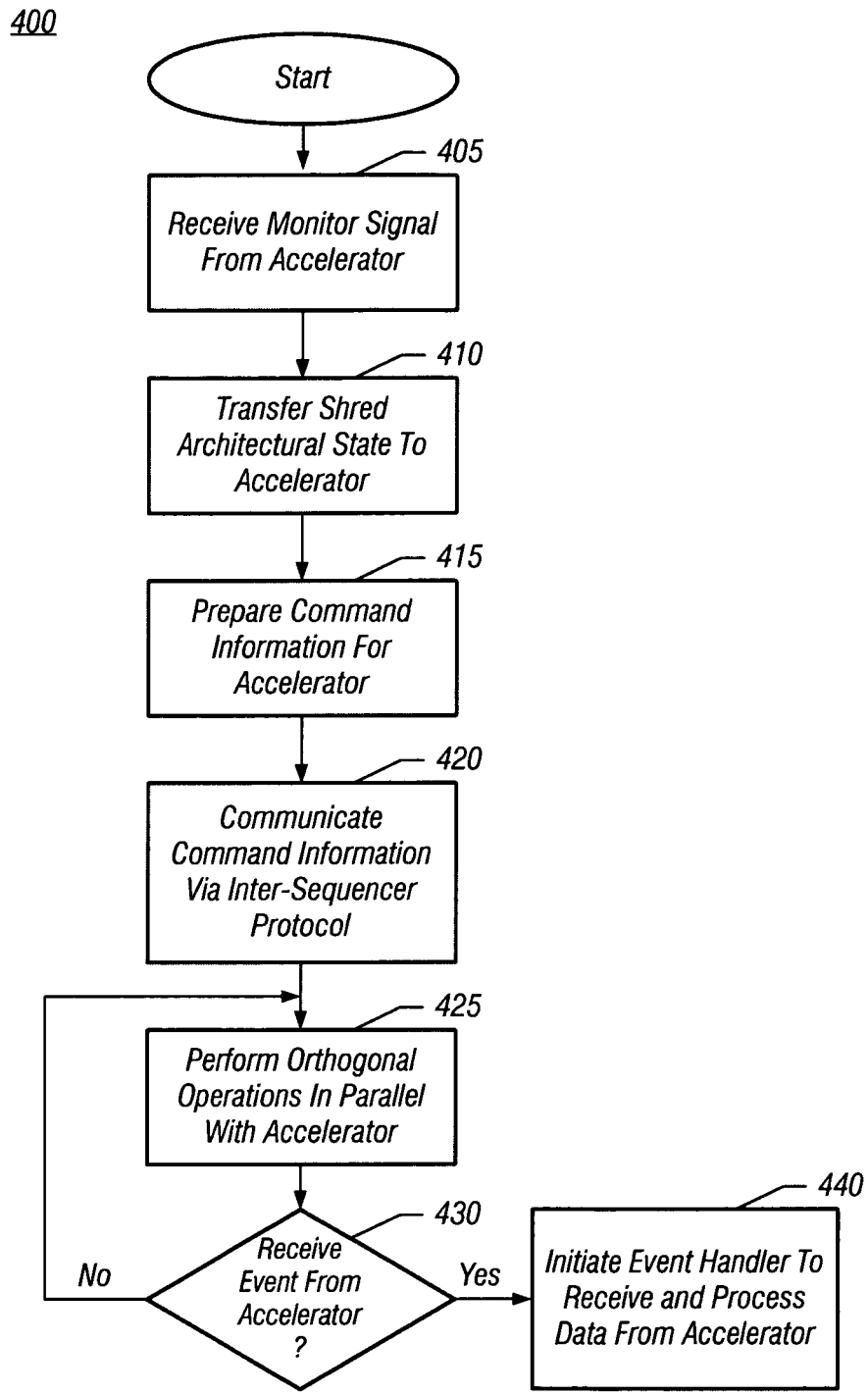
FIG. 5 is a flow diagram of a method corresponding to operations performed in a processor in accordance with one embodiment of the present invention.

Referring now to FIG. 5, shown is a flow diagram of a method in accordance with one embodiment of the present invention. As shown in FIG. 5, method 400 may be implemented in a sequencer, for example, a processor core or the like. As shown in FIG. 5, method 400 may begin by performing a start monitor (e.g., SEMONITOR instruction) to start monitoring a signal from an accelerator and associate the signal with an event handler in the sequencer (block 405). Specifically, such signal may be an identification or notification signal to indicate a message from the accelerator. The accelerator may be a heterogeneous resource with respect to the instruction sequencer, for example, of a different ISA or a non-sequencer. Accordingly, communications between the instruction sequencer and the accelerator may be via an exo-skeleton. Accordingly, the signal received from the accelerator may be received by the sequencer via the exo-skeleton.

To configure and enable the accelerator to perform operations on behalf of a user-level application, an architectural state for use with the application may be transferred to the accelerator (block 410), e.g., via SXFR. For example, the instruction sequencer may transfer via the exo-skeleton various information for a shred architectural state corresponding to register values, configuration information and the like.

Next, the instruction sequencer may prepare command information for the accelerator so that the accelerator can perform one or more operations on behalf of the user-level application (block 415). For example, the instruction sequencer may prepare command information, which may further include data to be manipulated or processed by the accelerator and/or particular acceleration functions to be applied on the data. Then, this command information may be communicated via an inter-sequencer protocol (block 420) e.g., including use of the SXFR instruction. More specifically, this protocol may be of the instruction sequencer's ISA. This information may be communicated directly to the exo-skeleton using the protocol, which may translate the protocol so that the underlying data can be passed to the accelerator.

Different manners of implementing such inter-sequencer protocol communications can occur in various embodiments. For example, in some embodiments a communication may include one or more instructions for each work element stored in a buffer, which may be a shared memory buffer between the instruction sequencer and the accelerator. In other embodiments, minimal command information may be sent from the instruction sequencer, for example, an instruction pointer (IP) to a code segment desired to be executed on the accelerator. Then, assuming that the accelerator is itself a sequencer, the accelerator may implement operations to fetch the code from the indicated location. The granularity with which command information is sent can also vary. For example, command information may be sent on a per-command basis or on a broader granularity, in different embodiments. In yet another embodiment, the first sequencer can send native commands to the accelerator via the exo-skeleton and without going through memory, and the accelerator can then directly execute the command.

Still referring to FIG. 5, next the instruction sequencer may perform orthogonal (e.g., independent) operations in parallel with the accelerator's operations under the instruction sequencer's command (block 425). That is, in some embodiments parallel operations, for example, MIMD operations may be performed so that both the instruction sequencer and the accelerator can perform useful work in parallel. In this way, the instruction sequencer need not wait for results from the accelerator, and can instead perform other useful work. Of course, the instruction sequencer may perform related operations in parallel.

Next it may be determined whether the instruction sequencer has received an event from the accelerator (diamond 430). Such event may be in the form of a notification or other message, indicating a status or completion of a task in the accelerator. Note that this determination need not be via synchronous polling, and instead the notification may be asynchronous and event-driven and thus non-polling-based. If no such event is received at diamond 430, control may pass back to block 425, discussed above. Instead, when an event is received, the instruction sequencer may initiate an event handler (e.g., originally registered via SMONITOR in block 405) to receive and process the data from the accelerator (block 440). In various implementations, this event handler may be a light-weight user-level handler such that the overhead of an OS call or context switch is avoided. In this way, improved operation may occur and result data may be obtained from the accelerator and used as desired by the user-level application. The control transfer to the handler may occur after the next instruction pointer is recorded (e.g., pushed to the stack) such that the suspended execution can later resume after the event handler completes.

Figure 6:
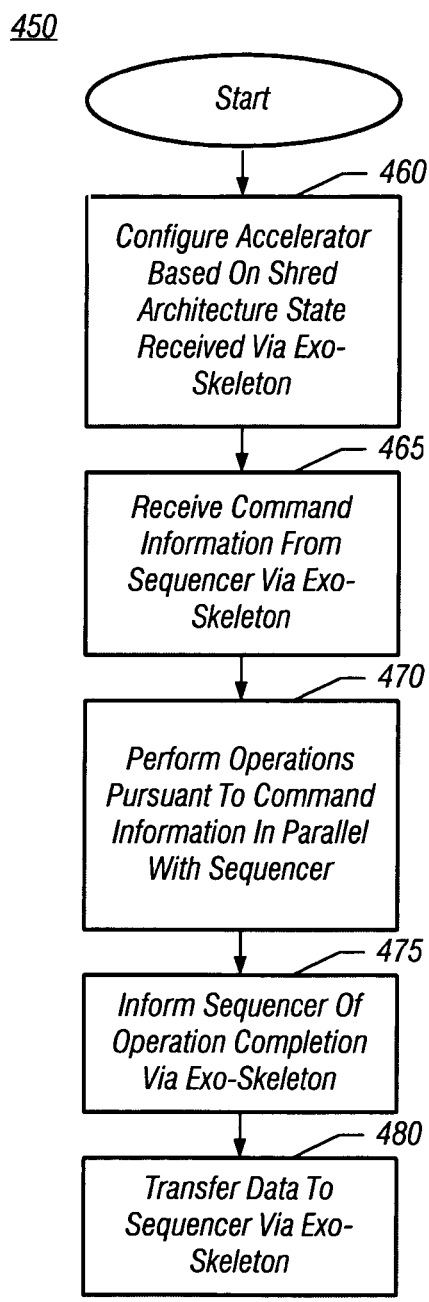
FIG. 6 is a flow diagram of a method corresponding to operations performed in an accelerator in accordance with an embodiment of the present invention.

Referring now to FIG. 6, shown is a flow diagram of a method corresponding to operations performed in an accelerator with an exo-skeleton in accordance with an embodiment of the present invention. As described above, this accelerator may be of a heterogeneous nature with respect to the sequencer. Accordingly, the exo-skeleton can provide inter-sequencer protocol communications. In response to block 410 (of FIG. 5, discussed above), the accelerator may receive shred architecture state information from the sequencer. Accordingly, the accelerator may be configured based on this information (block 460). Because of the heterogeneous nature of the accelerator, the exo-skeleton may be used to receive this inter-sequencer communication and translate it so that it may be handled by the accelerator.

Next, in response to block 420 (of FIG. 5), command information may be received from the sequencer via the exo-skeleton (block 465). Such command information may include control and/or configuration information along with data to be processed. Accordingly, the accelerator may perform operations pursuant to the command information (block 470). These operations may be performed in parallel with the sequencer performing operations on its own. That is, the sequencer need not wait for the accelerator to complete its operations before performing other useful work. As described above, the operations in the sequencer and the accelerator may be performed in MIMD fashion, and in some implementations may correspond to orthogonal operations.

When the accelerator completes its operations, the exo-skeleton may inform the sequencer accordingly (block 475). Then, under control of user-level code, for example, a light-weight user-level yield mechanism that initiates a user-level event handler, the data corresponding to various results obtained in the accelerator may be transferred to the sequencer via the exo-skeleton (block 480). While described with this particular flow in the embodiments of FIG. 5 and FIG. 6, it is to be understood that the scope of the present invention is not so limited.

Using an exo-sequencer in accordance with an embodiment of the present invention, different levels of abstraction may be implemented. For example, in some implementations, virtual or complex instruction set computing (CISC) instructions may be sent to an exo-skeleton, which then performs an expansion to map such instructions to a native physical instruction or command sequence for an accelerator which may be a sequencer of different ISA from the first sequencer or not a sequencer at all. Accordingly, if a basic command set of the accelerator is modified or improved over time, legacy support can still be provided via such levels of abstraction. In this way, improved performance on the accelerator may be effected even for legacy user-level applications. In other implementations, direct or reduced instruction set computing (RISC) instructions may be sent from a sequencer to an exo-sequencer that can directly execute the instruction on the accelerator hardware.

Figure 7:
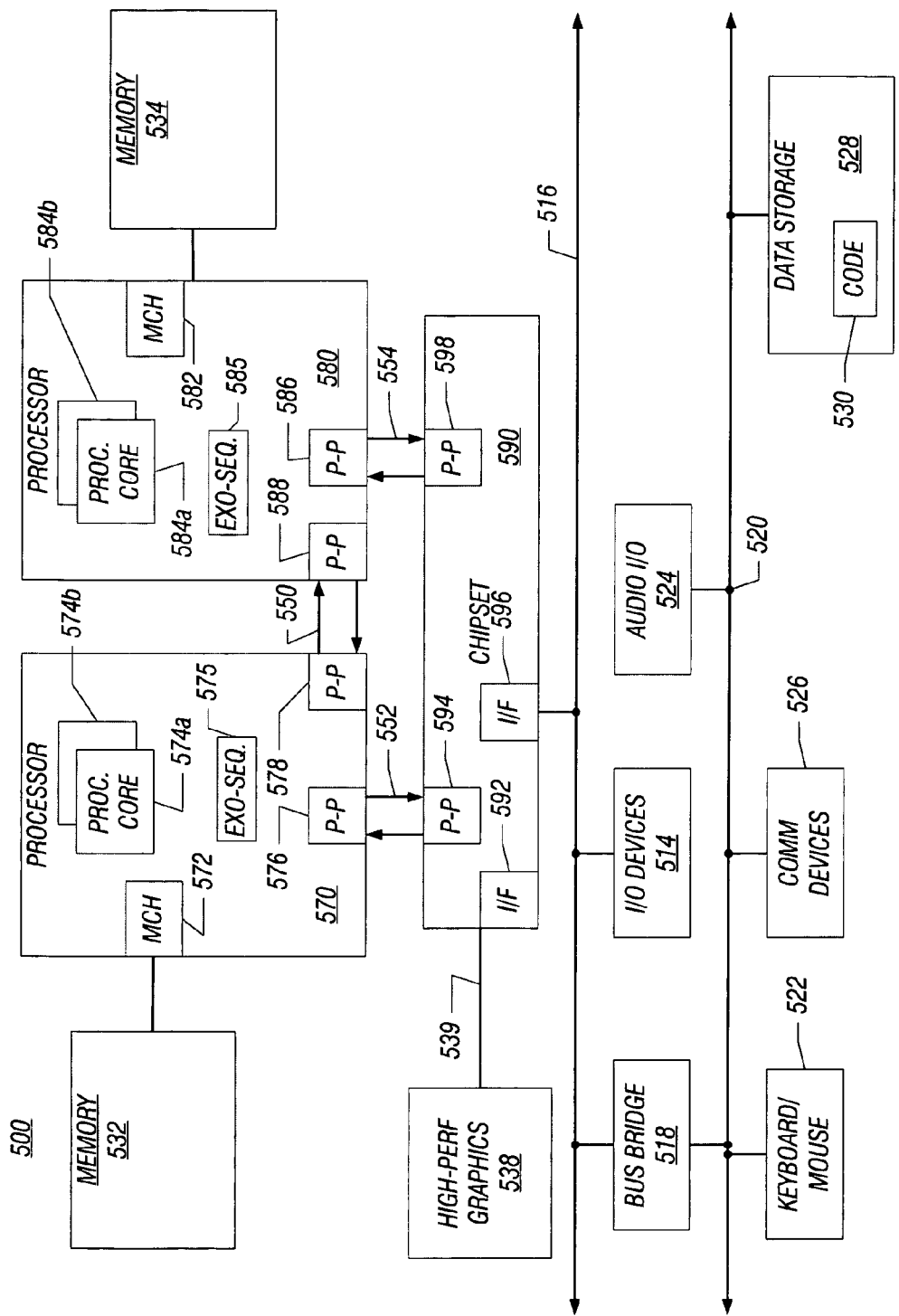
FIG. 7 is a block diagram of a system in accordance with another embodiment of the present invention.

Embodiments may be implemented in many different system types. Referring now to FIG. 7, shown is a block diagram of a system in accordance with an embodiment of the present invention. As shown in FIG. 7, multiprocessor system 500 is a point-to-point interconnect system, and includes a first processor 570 and a second processor 580 coupled via a point-to-point interconnect 550. As shown in FIG. 7, each of processors 570 and 580 may be multicore processors, including first and second processor cores (i.e., processor cores 574a and 574b and processor cores 584a and 584b). Each of processors 570 and 580 may further include an exo-sequencer, i.e., a first exo-sequencer 575 and a second exo-sequencer 585. As discussed above, exo-sequencers 575 and 585 may be heterogeneous resources with respect to the remaining resources of processor cores 570 and 580. While shown with only a single exo-sequencer per processor, it is to be understood that the scope of the present invention is not so limited. In other embodiments, multiple exo-sequencers may be present in a given processor. Furthermore, one or more exo-sequencers may be associated with each individual core of a processor.

First processor 570 further includes a memory controller hub (MCH) 572 and point-to-point (P-P) interfaces 576 and 578. Similarly, second processor 580 includes a MCH 582 and P-P interfaces 586 and 588. As shown in FIG. 7, MCH's 572 and 582 couple the processors to respective memories, namely a memory 532 and a memory 534, which may be portions of main memory locally attached to the respective processors.

First processor 570 and second processor 580 may be coupled to a chipset 590 via P-P interconnects 552 and 554, respectively. As shown in FIG. 7, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 may be used to couple graphics engine 538 to chipset 590. AGP bus 539 may conform to the *Accelerated Graphics Port Interface Specification, Revision* 2.0, published May 4, 1998, by Intel Corporation, Santa Clara, Calif. Alternately, a point-to-point interconnect 539 may couple these components.

In turn, chipset 590 may be coupled to a first bus 516 via an interface 596. In one embodiment, first bus 516 may be a Peripheral Component Interconnect (PCI) bus, as defined by the *PCI Local Bus Specification, Production Version, Revision* 2.1, dated June 1995 or a bus such as a PCI Express bus or another third generation I/O interconnect bus, although the scope of the present invention is not so limited.

As shown in FIG. 7, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520. Note that other architectures are possible. For example, instead of the point-to-point architecture of FIG. 7, a system may implement a multi-drop bus or another such architecture.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
communicating architectural state information from a user-level application executing on a first instruction sequencer of a multi-core processor to an accelerator of the multi-core processor via a first user-level instruction to configure the accelerator, wherein the accelerator comprises a heterogeneous resource with respect to the first instruction sequencer and having next instruction pointer logic to determine a next instruction to be executed by the accelerator;
communicating a request from the user-level application to the accelerator via a second user-level instruction;
providing the request to the accelerator via an interface logic associated with the accelerator, wherein the interface logic translates the request; and
performing a first function in the accelerator responsive to the request in parallel with a second function in the first instruction sequencer, the second function orthogonal to the first function.

2. The method of claim 1, wherein communicating the request comprises sending the request to the interface logic and passing the request from the interface logic to the accelerator according to a private protocol between the interface logic and the accelerator.

3. The method of claim 2, further comprising sending the request to the interface logic via a first instruction set architecture and wherein the accelerator comprises a resource of a second instruction set architecture.

4. The method of claim 1, further comprising directly communicating the request without operating system (OS) support, wherein the accelerator is transparent to the OS, and wherein the first function is of a first user-level shred and the second function is of a second user-level shred, the first and second user-level shreds of the user-level application and scheduled by a first OS thread of a plurality of OS threads into which the user-level application is split.

5. The method of claim 1, further comprising providing a subset of an architectural state of the accelerator to the user-level application responsive to the request.

6. The method of claim 1, further comprising providing an aggregate architectural state of the interface logic and the accelerator to the user-level application responsive to the request.

7. The method of claim 1, further comprising identifying a disabled resource of a chipset of a system that is configured to perform a graphics function but is disabled due to presence of an add-in graphics device that is configured to perform the graphics function, and configuring the disabled resource to be a second accelerator using the user-level application and without operating system (OS) support.

8. The method of claim 1, further comprising virtualizing the accelerator via the interface logic so that a first subset of functionality within the accelerator is visible to the user-level application and a second subset of functionality within the accelerator is visible to an operating system (OS), wherein the interface logic includes storages each to store the architectural state of the accelerator for a corresponding context.

9. The method of claim 1, further comprising performing a third user-level instruction in the first instruction sequencer to monitor for a signal for an event from the accelerator and associating the signal with a user-level handler.

10. The method of claim 1, further comprising asynchronously receiving an event in the first instruction sequencer from the accelerator to indicate task status and responsive to the event initiating a user-level handler to receive and process data from the accelerator.

* * * * *